(12) United States Patent
Okamura et al.

(10) Patent No.: US 12,034,337 B2
(45) Date of Patent: Jul. 9, 2024

(54) ROTATING ELECTRICAL MACHINE AND METHOD OF MANUFACTURING THE SAME

(71) Applicant: DENSO CORPORATION, Kariya (JP)

(72) Inventors: Tomoyuki Okamura, Kariya (JP); Kensuke Hirai, Kariya (JP); Tadahiro Kurasawa, Kariya (JP)

(73) Assignee: DENSO CORPORATION, Kariya (JP)

( * ) Notice: Subject to any disclaimer, the term of this patent is extended or adjusted under 35 U.S.C. 154(b) by 205 days.

(21) Appl. No.: 17/512,854

(22) Filed: Oct. 28, 2021

(65) Prior Publication Data

US 2022/0140673 A1 May 5, 2022

(30) Foreign Application Priority Data

Oct. 29, 2020 (JP) .................................. 2020-181141

(51) Int. Cl.
| | |
|---|---|
| H02K 3/32 | (2006.01) |
| H02K 1/26 | (2006.01) |
| H02K 1/27 | (2022.01) |
| H02K 35/06 | (2006.01) |

(52) U.S. Cl.
CPC ............... *H02K 1/27* (2013.01); *H02K 1/265* (2013.01); *H02K 35/06* (2013.01)

(58) Field of Classification Search
CPC ........ H02K 3/32; H02K 3/28; H02K 2203/09; H02K 1/265; H02K 3/50; H02K 3/38
USPC .................................................. 310/71, 152
See application file for complete search history.

(56) References Cited

U.S. PATENT DOCUMENTS

| | | | | |
|---|---|---|---|---|
| 2015/0097453 A1* | 4/2015 | Nishikawa | ............... | H02K 3/50 310/71 |
| 2015/0295371 A1 | 10/2015 | Houzumi et al. | | |
| 2016/0036187 A1* | 2/2016 | Houzumi | ............... | H01R 43/16 264/255 |
| 2016/0190884 A1* | 6/2016 | Nakamura | ............... | H02K 3/50 310/208 |

(Continued)

FOREIGN PATENT DOCUMENTS

| | | |
|---|---|---|
| DE | 10 2018 125 834 A1 | 4/2020 |
| JP | 2006-246594 A | 9/2006 |
| JP | 2010-233327 A | 10/2010 |

*Primary Examiner* — Michael Andrews
(74) *Attorney, Agent, or Firm* — Oliff PLC

(57) ABSTRACT

In an armature, a busbar unit includes at least first-, second-, and third-phase busbars electrically connected to respective first-, second-, and third-phase armature windings. The first-phase busbar serves as a lowermost busbar in the axial direction, the second-phase busbar serves as an intermediate busbar stacked over the lowermost busbar in the axial direction, and the third-phase busbar serves as an uppermost busbar stacked over the intermediate busbar in the axial direction. A resin member of the busbar unit covers the lowermost busbar, intermediate busbar, and uppermost busbar stacked in the axial direction, so that the lowermost busbar, intermediate busbar, and uppermost busbar are integrated to constitute a busbar stack. A protrusion member is mounted to the intermediate busbar and protruding radially outward from the intermediate busbar. At least part of the protrusion member is located to be nonoverlapped with the uppermost busbar and the lowermost busbar.

7 Claims, 6 Drawing Sheets

(56) References Cited

U.S. PATENT DOCUMENTS

2016/0218578 A1* 7/2016 Yamada .................. H02K 3/522
2019/0001452 A1* 1/2019 Nagahama ............. B25D 17/00

* cited by examiner

ROTATING ELECTRICAL MACHINE AND METHOD OF MANUFACTURING THE SAME

CROSS REFERENCE TO RELATED APPLICATIONS

This application is based on and claims the benefit of priority from Japanese Patent Application Publication No. 2020-181141 filed on Oct. 29, 2020, the disclosure of which is incorporated in its entirety herein by reference.

TECHNICAL FIELD

The present disclosure relates to rotating electrical machines and methods of manufacturing a rotating electrical machine.

BACKGROUND

Rotating electrical machines include an armature comprised of a core, and multi-phase armature windings wound in and around the core.

SUMMARY

According to a measure of the present disclosure, there is provided a rotary electric machine. The rotary electric machine includes an armature and a busbar unit. The busbar unit includes at least first-, second-, and third-phase busbars electrically connected to respective first-, second-, and third-phase armature windings. The first-phase busbar serves as a lowermost busbar in the axial direction, the second-phase busbar serves as an intermediate busbar stacked over the lowermost busbar in the axial direction, and the third-phase busbar serves as an uppermost busbar stacked over the intermediate busbar in the axial direction. A resin member of the busbar unit covers the lowermost busbar, intermediate busbar, and uppermost busbar stacked in the axial direction, so that the lowermost busbar, intermediate busbar, and uppermost busbar are integrated to constitute a busbar stack. A protrusion member is mounted to the intermediate busbar and protruding radially outward from the intermediate busbar. At least part of the protrusion member is located to be nonoverlapped with the upper most busbar and the lowermost busbar in the axial direction.

DETAILED DESCRIPTION OF EMBODIMENTS

Figure 1:
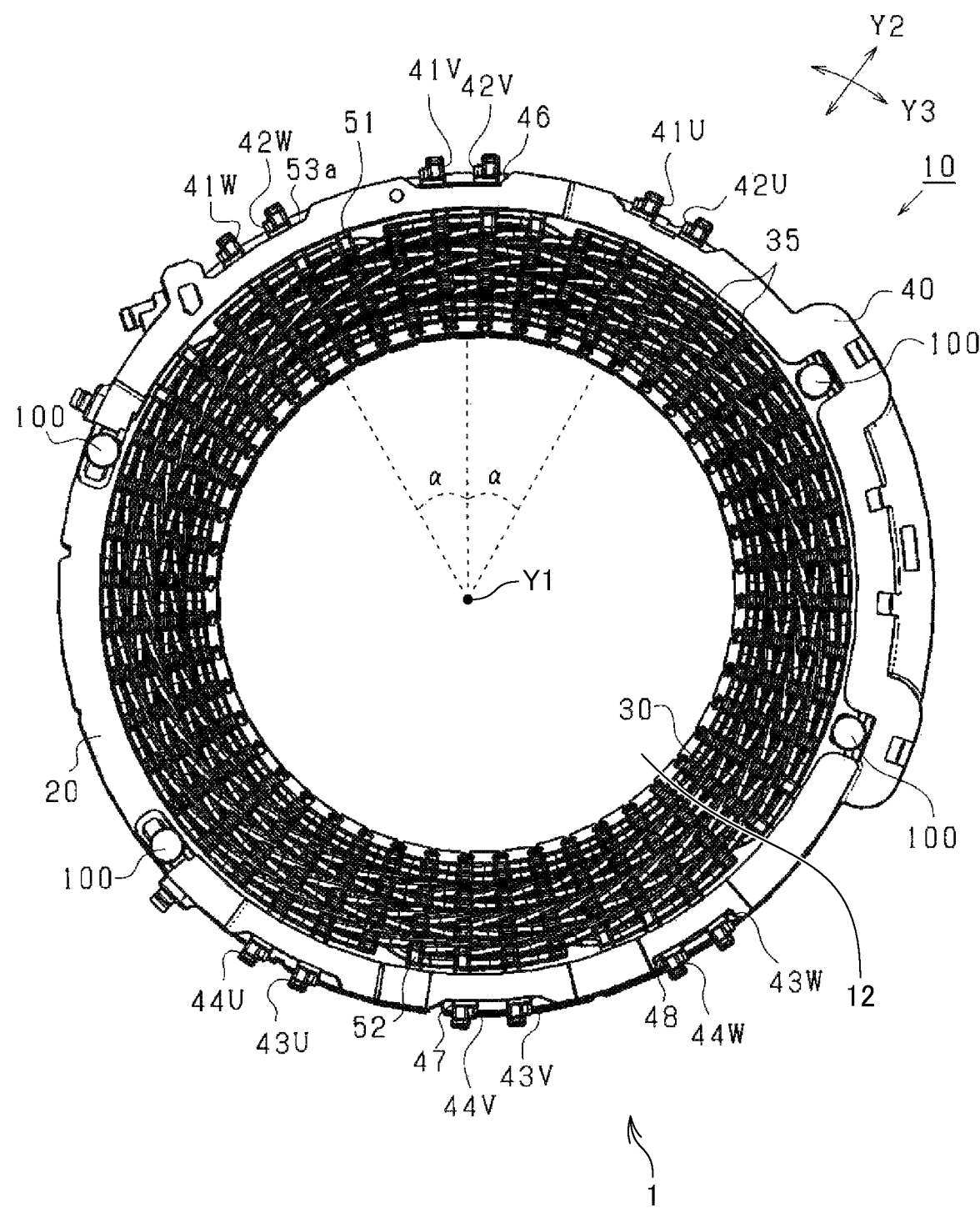
FIG. 1 is a plan view of a stator according to an exemplary embodiment.

German Patent Application Publication No. DE102018125834 discloses an example of such armature windings. Each of the disclosed armature windings includes a plurality coil segments, each of which has a U-shape.

The following describes how a selected phase armature winding in the multi-phase armature windings is wound around and in a cylindrical core.

Each U-shaped coil segment, which is comprised of a U-shaped body and legs extending therefrom, of the selected phase armature winding is inserted in corresponding slots of the cylindrical core from a first end face of the core while ends of the legs of each U-shaped coil segment protrude outward from a second end face of the core, so that the ends of the respective legs of each U-shaped coil segment are disposed over the second end face of the core.

One of the ends of the legs of each U-shaped coil segment of the selected phase armature winding is joined to a selected one of the ends of the legs of another U-shaped coil segment, and the other of the ends of the legs of each U-shaped coil segment of the selected phase armature winding is joined to a selected one of the ends of the legs of another U-shaped coil segment of the selected phase armature winding. This results in the selected phase armature winding being wound in and around the core.

In particular, the above armature, which is comprised of the core and the multi-phase armature winding wound in and around the core, has (1) A first portion constituted by ends of the U-shaped bodies of the coil segments, which protrude from the first end face of the core (2) A second portion constituted by the legs of the coil segments protruding from the second end face of the core The first portion of the armature will also be referred to as a first coil end, and the second portion of the armature will also be referred to as a second coil end.

The coil segments of each phase armature winding are connected through a corresponding connection rail, i.e., a busbar, to a corresponding power line that is connected to, for example, an inverter.

Each of the busbars for the respective phase armature windings has a hollow cylindrical shape, and is disposed radially outside of the ends of the coil segments of the corresponding phase armature winding. In particular, each of the busbars for the respective phase armature windings is disposed to overlay an outer peripheral edge of the second end face of the core in the axial direction of the core; the outer peripheral edge of the whole of the core serves as a back yoke. This arrangement of the busbars for the respective phase armature windings enables the armature to have a relatively small radial dimension and a relatively small axial dimension.

Typically, the armature includes three-phase armature windings as the multiphase armature windings, so that the busbars for the respective three-phase armature windings are stacked in the axial direction of the core.

Because the busbars for the respective three-phase armature windings are required to be electrically insulated from one another, the busbars for the respective three-phase armature windings are stacked in the axial direction of the core while being respectively separated from one another with predetermined spaces therebetween.

Unfortunately, it may be difficult to stack the busbars for the respective three-phase armature windings in the axial direction of the core while ensuring, among the busbars, the predetermined spaces sufficient to electrically insulate the busbars from one another within the axial length of the second coil end. This may therefore result in an insulation failure among the busbars for the respective three-phase armature windings.

In view of the circumstances set forth above, a first aspect of the present disclosure seeks to provide rotating electrical machines and armatures, each of which is designed to have a smaller size while having a proper electrical insulation among busbars. A second aspect of the present disclosure seeks to provide method of manufacturing such a rotating electrical machine.

According to a first aspect of the present disclosure, there is provided a rotary electric machine. The rotary electric machine includes an armature that includes an armature core and first-, second-, and third-phase armature windings wound at least around the armature core. The rotary electric machine includes a magnetic field generator that generates a magnetic field, and a busbar unit. The busbar unit includes at least first-, second-, and third-phase busbars electrically connected to the respective first-, second-, and third-phase armature windings. The first-phase busbar serves as a lowermost busbar located to face the armature core in the axial direction. The second-phase busbar serves as an intermediate busbar stacked over the lowermost busbar in the axial direction. The third-phase busbar serves as an uppermost busbar stacked over the intermediate busbar in the axial direction, so that the lowermost busbar, intermediate busbar, and uppermost busbar are stacked in the axial direction. A resin member of the busbar unit covers the lowermost busbar, intermediate busbar, and uppermost busbar stacked in the axial direction, so that the lowermost busbar, intermediate busbar, and uppermost busbar are integrated to constitute a busbar stack. A protrusion member is mounted to the intermediate busbar and protrudes radially outward from the intermediate busbar. At least part of the protrusion member is located to be nonoverlapped with the uppermost busbar and the lowermost busbar in the axial direction.

According to a second aspect of the present disclosure, there is provided a method of manufacturing a rotary electric machine that includes an armature that includes an armature core and first-, second-, and third-phase armature windings wound at least around the armature core. The rotary electric machine includes a magnetic field generator that generates a magnetic field, and a busbar unit. The busbar unit includes at least first-, second-, and third-phase busbars electrically connected to the respective first-, second-, and third-phase armature windings. The first-phase busbar serves as a lowermost busbar located to face the armature core in the axial direction. The second-phase busbar serves as an intermediate busbar stacked over the lowermost busbar in the axial direction. The third-phase busbar serves as an uppermost busbar stacked over the intermediate busbar in the axial direction, so that the lowermost busbar, intermediate busbar, and upper most busbar being stacked in the axial direction. The busbar unit includes a resin member that covers the lowermost busbar, intermediate busbar, and uppermost busbar stacked in the axial direction, so that the lowermost busbar, intermediate busbar, and uppermost busbar are integrated to constitute a busbar stack. The rotary electric machine includes a protrusion member mounted to the intermediate busbar and protruding radially outward from the intermediate busbar. At least part of the protrusion member is located to be nonoverlapped with the upper most busbar and the lowermost busbar.

The method includes
(1) Covering the intermediate busbar with first resin while a part of the protrusion portion is supported
(2) Locating, below the intermediate busbar, a first busbar to serve as the lowermost busbar
(3) Stacking, over the intermediate busbar, a second busbar to serve as the uppermost busbar, so that a busbar stack comprised of the lowest busbar, intermediate busbar, and uppermost busbar is constructed
(4) Covering the busbar stack with second resin to accordingly enclose the busbar stack with the second resin, thus integrally packaging the busbar stack with the second resin According to a third aspect of the present disclosure, there is provided an armature. The armature includes an armature core and first-, second-, and third-phase armature windings wound at least around the armature core. The armature includes a busbar unit that includes at least first-, second-, and third-phase busbars electrically connected to the respective first-, second-, and third-phase armature windings. The first-phase busbar serves as a lowermost busbar located to face the armature core in the axial direction. The second-phase busbar serves as an intermediate busbar stacked over the lowermost busbar in the axial direction. The third-phase busbar serves as an uppermost busbar stacked over the intermediate busbar in the axial direction, so that the lowermost busbar, intermediate busbar, and uppermost busbar being stacked in the axial direction. A resin member of the busbar unit covers the lowermost busbar, intermediate busbar, and upper most busbar stacked in the axial direction, so that the lowermost busbar, intermediate busbar, and uppermost busbar are integrated to constitute a busbar stack. The armature includes a protrusion member mounted to the intermediate busbar and protruding radially outward from the intermediate busbar. At least part of the protrusion member is located to be nonoverlapped with the uppermost busbar and the lowermost busbar.

The following describes an exemplary embodiment of the present disclosure with reference to the accompanying drawings. In the exemplary embodiment and its modifications, like parts among the exemplary embodiment and its modifications, to which like reference characters are assigned, are omitted or simplified to avoid redundant description.

The exemplary embodiment describes a motor 1 as an example of a rotating electrical machine according to the present disclosure; the motor 1 according to the exemplary embodiment tis used as a vehicular motor.

The motor 1 according to the exemplary embodiment is designed as a permanent-magnet field motor, more specifically, as a permanent-magnet field synchronous motor equipped with three-phase windings.

As illustrated in FIG. 1, the motor 1 is designed as, for example, an inner-rotor motor 1 that includes an annular cylindrical stator 10, which serves as an armature, and a cylindrical rotor 12.

The rotor 12 is configured as one of typical well-known permanent-magnet field rotors that include
(i) An Interior Permanent Magnet (IPM) rotor, which is comprised of a cylindrical rotor core and at least one pair of permanent magnets embedded in the cylindrical rotor core
(ii) A Surface Permanent Magnet (SPM) rotor, which is comprised of a cylindrical rotor core and at least one pair of permanent magnets mounted on the outer peripheral surface of the cylindrical rotor core The rotor 12 can also be designed as a wound-field rotor.

The rotor 12 is disposed radially inside the stator 10 with a gap relative to the stator 10 to be rotatable relative to the stator 10 about a center axis Y1 of the stator 10; the center axis Y1 of the stator 10 serves therefore as a rotational axis Y1 of the rotor 12.

Hereinafter, the exemplary embodiment defines an axial direction as a direction of the center axis Y1 of the stator 10 (see FIG. 1), that is, a direction of the rotational axis Y1 of the rotor 12. The exemplary embodiment defines radial directions (see reference character Y2 in FIG. 1) as radial directions of the center axis Y1 of the stator 10, i.e., radial directions of the rotational axis Y1 of the rotor 12. The exemplary embodiment defines a circumferential direction (see reference character Y3 in FIG. 1) as a circumferential direction of the stator 10, i.e., a circumferential direction of the rotational axis Y1 of the rotor 12.

Figure 2:
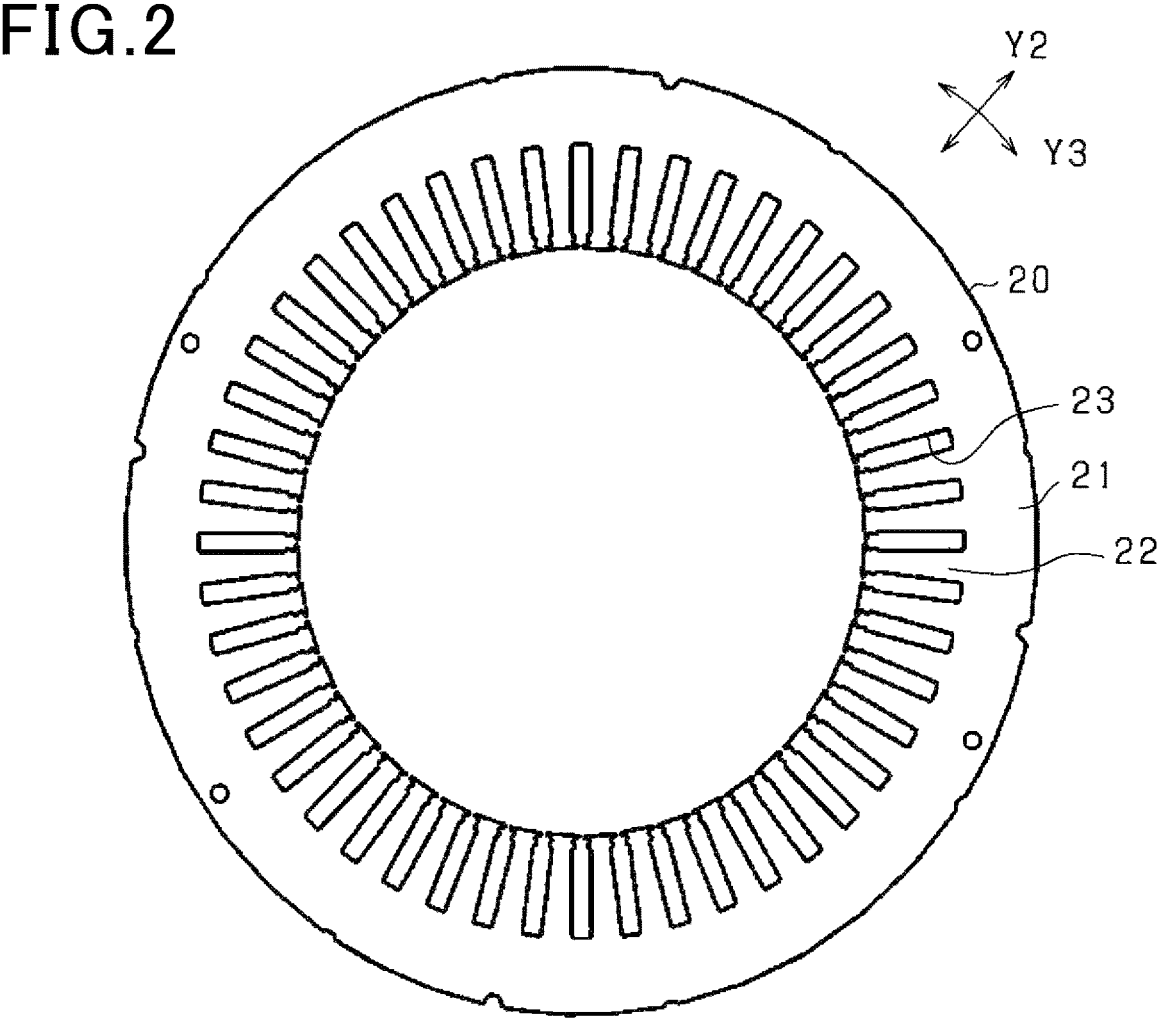
FIG. 2 is a plan view of a stator core illustrated in FIG. 1.

Specifically, the stator 10 is comprised of, as illustrated in FIGS. 1 and 2, an annular cylindrical core (stator core) 20 and a coil (stator coil) 30, and a busbar unit 40. The stator core 20 is disposed radially outside the rotor 12 with the gap relative to the rotor 12 to face the rotor 12.

The stator coil 30 is comprised of three-phase stator windings, i.e., U-, V-, and W-phase stator windings, 30U, 30V, and 30W, serving as three-phase armature windings; the three-phase stator windings 30U, 30V, and 30W are wound in and around the stator core 20. Each of the three-phase stator windings 30U, 30V, and 30W has opposing first and second ends.

The busbar unit 40 serves as connection members for (i) electrical connection of the first ends of the three-phase stator windings 30U, 30V, and 30W to respective power lines PLU, PLV, and PLW and (ii) electrical connection of the second ends of the three-phase stator windings 30U, 30V, and 30W to one another. Each of the power lines PLU, PLV, and PLW has opposing first and second ends.

The stator core 20, which has opposing first and second end faces in the axial direction, includes, as illustrated in FIG. 2, an annular cylindrical back yoke, i.e., a back core, 21, and a plurality of teeth 22 each disposed to protrude from the inner peripheral surface of the back yoke 21 toward the center axis Y1 of the stator 10 in a corresponding radial direction; the teeth 22 are arranged in the circumferential direction with predetermined intervals. The teeth 22 arranged in the circumferential direction with the predetermined intervals define a plurality of slots (stator slots) 23. That is, each adjacent pair of teeth 22 defines a corresponding one of the slots 23 between the corresponding adjacent pair of teeth 22. Each adjacent pair of the slots 23 has an angle with respect to the center axis Y1 of the stator 20.

The three-phase stator windings 30U, 30V, and 30W are wound around the back yoke 21 of the stator core 20 and in the slots 23, so that the stator coil, i.e., a stator coil assembly 30, is constructed.

Next, the following describes each of the three-phase stator windings 30U, 30V, and 30W.

Each of the three-phase stator windings 30U, 30V, and 30W is comprised of conductor segments 35, each of which has a substantially rectangular shape in its lateral cross section, and has been shaped to have a substantially U-shape. Each of the U-shaped conductor segments 35 of, for example, the U-phase stator winding 30U is comprised of a U-shaped body and legs extending therefrom. The legs of each of the U-shaped conductor segments is filled in corresponding slots 23 of the stator core 20 such that the legs of each of the U-shaped conductor segments 35 protrude from the corresponding slots 23 of the stator core 20.

The legs of each of the U-shaped conductor segments 35 protruding from the corresponding slots 23 of the stator core 20 are disposed over the second end face of the stator core 20 while the U-shaped body of each of the U-shaped conductor segments 35 is disposed over the first end face of the stator core 20.

One of the ends of the legs of each U-shaped conductor segment 35 of the U-phase stator winding 30U is joined to a selected one of the ends of the legs of another U-shaped conductor segment 35 of the U-phase stator winding 30U, and the other of the ends of the legs of each U-shaped conductor segment 35 of the U-phase stator winding 30U is joined to a selected one of the ends of the legs of another U-shaped conductor segment 35 of the U-phase stator winding 30U. This results in the U-phase armature winding 30U being formed to be wound through the slots 23 in the stator core 20.

Like the U-phase stator winding 30U, the V-phase armature winding 30V being formed to be wound through the slots 23 in the stator core 20, and W-phase armature winding 30W being formed to be wound through the slots 23 in the stator core 20.

The U-, V-, and W-phase stator windings 30U, 30V, and 30W being wound through the slots 23 in the stator core 20 constitutes the stator coil 30, i.e., the stator coil assembly 30.

The stator coil 30, i.e., the stator coil assembly 30, has (1) A first portion constituted by ends of the U-shaped bodies of the conductor segments 35 of the three-phase stator windings 30U, 30V, and 30W, which protrude from the first end face of the stator core 20

(2) A second portion constituted by the legs of the conductor segments 35 of the three-phase stator windings 30U, 30V, and 30W, which protrude from the second end face of the stator core 20

The first portion of the stator coil 30 will also be referred to as a first coil end, and the second portion of the stator coil 30 will also be referred to as a second coil end.

Figure 3:
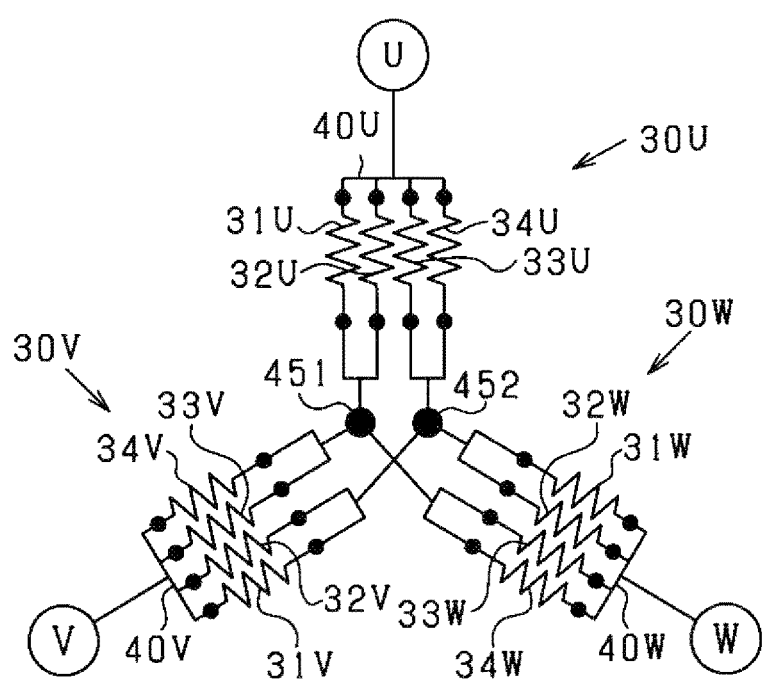
FIG. 3 is a connection configuration diagram illustrating a connection configuration of stator windings.

In particular, as illustrated in FIG. 3, the U-phase stator winding 30U is comprised of four winding sections 31U, 32U, 33U, and 34U that are connected in parallel to each other, the V-phase stator winding 30V is comprised of four winding sections 31V, 32V, 33V, and 34V that are connected in parallel to each other, and the W-phase stator winding 30W is comprised of four winding sections 31W, 32W, 33W, and 34W that are connected in parallel to each other.

Each of the winding sections 31U, 32U, 33U, and 34U, the winding sections 31V, 32V, 33V, and 34V, and winding sections 31W, 32W, 33W, and 34W has opposing first and second ends.

The first ends of the respective winding sections 31U to 34U of the U-phase stator winding 30U are connected to the first end of the power line PLU through the busbar unit 40, and the second end of the power line PLU is connected to a power source, such as a battery pack, via a power converter, such as an inverter (see FIG. 3).

Like the U-phase stator winding 30U, the first ends of the respective winding sections 31V to 34V of the V-phase stator winding 30V are connected to the first end of the power line PLV through the busbar unit 40, and the second end of the power line PLV is connected to the power source via the power converter, and the first ends of the respective winding sections 31W to 34W of the W-phase stator winding 30W are connected to the first end of the power line PLW through the busbar unit 40, and the second end of the power line PLW is connected to the power source via the power converter (see FIG. 3).

The second ends of the respective winding sections 31U and 32U, the second ends of the respective winding sections 33V and 34V, and the second ends of the respective winding sections 33W and 34W are connected to one another through the busbar unit 40 in a star configuration (see FIG. 3). Similarly, the second ends of the respective winding sections 33U and 34U, the second ends of the respective winding sections 31V and 32V, and the second ends of the respective winding sections 31W and 32W are connected to one another through the busbar unit 40 in a star configuration (see FIG. 3).

When three-phase alternating-current (AC) voltages are applied to the respective three-phase stator windings 30U, 30V, and 30W from the power source through the power converter, the three-phase stator windings 30U, 30V, and 30W create a rotating magnetic field, i.e., a rotating magnetic flux. This enables the rotor 12 to turn based on magnetic attractive force between the rotating magnetic field (rotating magnetic flux) and the magnetic field generated from the at least one pair of permanent magnets of the rotor 12.

As described above, the motor 1 according to the exemplary embodiment is comprised of the rotor 12 serving as a magnetic field generator, and the stator 10 serving as an armature, but the motor 1 can be comprised of a stator serving as a magnetic field generator, and a rotor serving as an armature.

Next, the following describes, in detail, an example of the configuration of the busbar unit 40 according to the exemplary embodiment.

Figure 4:
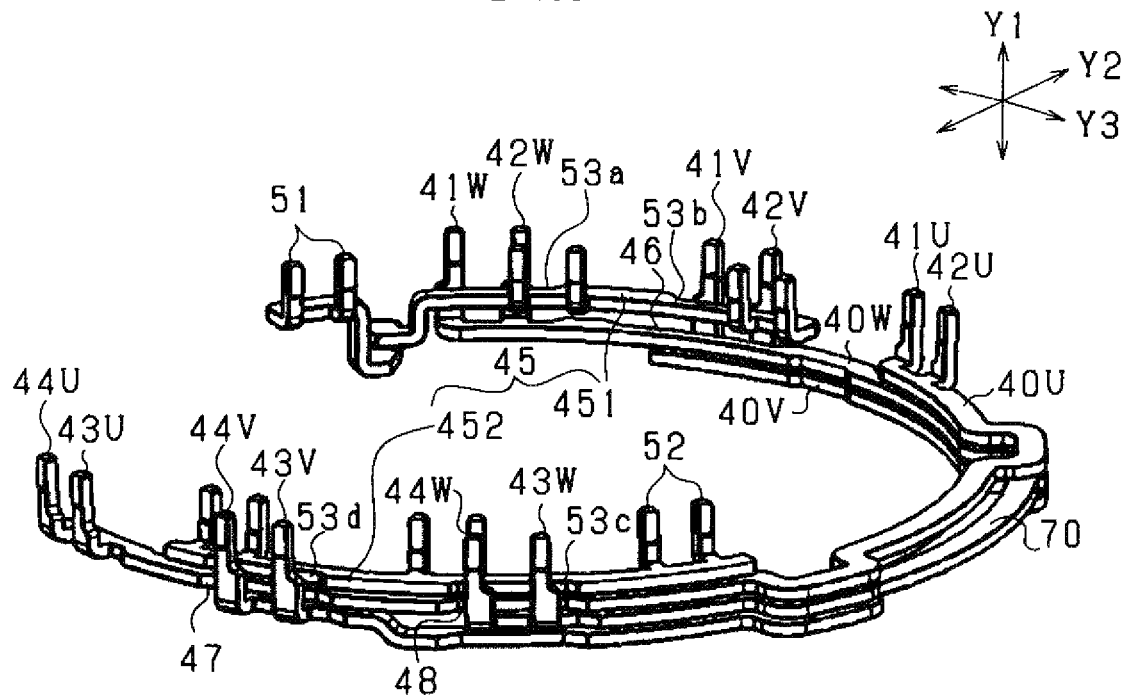
FIG. 4 is a perspective view of three-phase busbars.

As illustrated in FIG. 4, the busbar unit 40 includes a U-phase busbar 40U, a V-phase busbar 40V, a W-phase busbar 40W, and a neutral busbar set 45 comprised of a first neutral-line busbar 451 and a second neutral-line busbar 452.

The busbar unit 40 also includes connection terminals 41U, 42U, 43U, and 44U for the U-phase, connection terminals 41V, 42V, 43V, and 44V for the V-phase, and connection terminals 41W, 42W, 43W, and 44W for the W-phase.

Each of the busbars 40U, 40V, 40W, 451, and 452 has a circular-arc shape.

The U-phase busbar 40U is configured to electrically connect the first ends of the respective winding sections 31U to 34U of the U-phase stator winding 30U to the first end of the power line PLU. The V-phase busbar 40V is configured to electrically connect the first ends of the respective winding sections 31V to 34V of the V-phase stator winding 30V to the first end of the power line PLV. Similarly, the W-phase busbar 40W is configured to electrically connect the first ends of the respective winding sections 31W to 34W of the W-phase stator winding 30W to the first end of the power line PLW.

The first neutral-line busbar 451 serves as a first neutral point (first neutral line) through which the second ends of the respective winding sections 31U and 32U, the second ends of the respective winding sections 33V and 34V, and the second ends of the respective winding sections 33W and 34W are connected.

The second neutral-line busbar 452 serves as a second neutral point (second neutral line) through which the second ends of the respective winding sections 33U and 34U, the second ends of the respective winding sections 31V and 32V, and the second ends of the respective winding sections 31W and 32W are connected.

The U-phase busbar 40U, V-phase busbar 40V, and W-phase busbar 40W are stacked in the axial direction. In particular, the W-phase busbar 40W is at least partly stacked over, for example, the V-phase busbar 40V, and the U-phase busbar 40U is at least partly stacked over the U-phase busbar 40U. The first neutral-line busbar 451 is for example stacked over a portion of the W-phase busbar 40W; no U-phase busbar 40U is mounted on the portion of the W-phase busbar 40W. The second neutral-line busbar 452 is for example stacked over a portion of the U-phase busbar 40U.

The busbars 40U, 40V, 40W, 451, and 452 configured set forth above constitute a busbar stack assembly.

The busbar unit 40 also includes a resin member, i.e., a resin cover or a resin container, 60. The resin member 60 is configured to cover the busbar stack assembly, so that the busbar stack assembly covered with the resin member 60 constitutes the busbar unit 40 having overall a circular-arc shape.

The circular-arc shaped busbar unit 40 has a radial width that is determined to be located within a radial width of the back yoke 21, and has a degree of curvature, i.e., a radius of curvature, that is determined to be substantially identical to that of the back yoke 21, i.e., the stator core 20. Additionally, the circular-arc shaped busbar unit 40 has an axial height that is determined to be located within an axial length of a selected one of the first and second coil ends of the stator coil 30.

The circular-arc shaped busbar unit 40 is, as illustrated in FIG. 1, mounted on a selected one of the first end face and the second end face of the back yoke 21 of the stator core 20, and fastened to the stator core 20 with fastening members 100, such as pins; the selected one of the first end face and the second end face of the back yoke 21 of the stator core 20 corresponds to the selected one of the first and second coil ends of the stator core 20.

Because the radial width of the circular-arc shaped busbar unit 40 is determined to be located within the radial width of the back yoke 21, and the degree of curvature of the circular-arc shaped busbar unit 40 is determined to be substantially identical to that of the back yoke 21, i.e., the stator core 20, the circular-arc shaped busbar unit 40 is mounted on the selected one of the first end face and the second end face of the back yoke 21 of the stator core 20 without radially protruding from the back yoke 21.

Because the axial height of the circular-arc shaped busbar unit 40 is determined to be located within the axial length of the selected one of the first and second coil ends of the stator coil 30, the circular-arc shaped busbar unit 40 is mounted on the selected one of the first end face and the second end face of the back yoke 21 of the stator core 20 without axially protruding from the selected one of the first and second coil ends of the stator core 20.

Next, the following describes an example of the configuration of each of the U-, V-, and W-phase busbars 40U, 40V, and 40W.

Each of the U-, V-, and W-phase busbars 40U, 40V, and 40W is comprised of a rectangular bar having a rectangular shape in its transverse cross section, and has a circular-arc shape set forth above.

The busbar stack assembly of the busbars 40U, 40V, and 40W are configured such that (1) A first busbar selected from the busbars 40U, 40V, and 40W is stacked over one of the first and second end faces of the back yoke 21 of the stator core 20 while one major surface of the first busbar faces the one of the first and second end faces of the back yoke 21 with a first interval therebetween (2) A second busbar selected from the remaining two of the busbars 40U, 40V, and 40W is stacked over the first busbar while one major surface of the second busbar faces the other major surface of the first busbar with a second interval therebetween (3) The remaining busbar is stacked over the second busbar while one major surface of the remaining busbar faces the other major surface of the second busbar with a third interval therebetween (4) A first part of the resin member 60 is filled in the first interval between the one major surface of the first busbar and the one of the first and second end faces of the back yoke 21

(5) A second part of the resin member 60 is filled in the second interval between the one major surface of the second busbar and the other major surface of the first busbar (6) A third part of the resin member 60 is filled in the third interval between the one major surface of the remaining busbar and the other major surface of the second busbar This enables the U-, V-, and W-phase busbars 40U, 40V, and 40W to be stacked while being electrically insulated from one another.

In particular, the stator coil 30 according to the exemplary embodiment is configured such that (1) The V-phase busbar 40V is stacked over one of the first and second end faces of the back yoke 21 of the stator core 20, the W-phase busbar 40W is stacked over the V-phase busbar 40V, and the U-phase busbar 40U is stacked over the W-phase busbar 40W (2) The V-phase busbar 40V is located closest to the stator core 20 in all the busbars 40U to 40W (3) The U-phase busbar 40U is located farthest from the stator core 20 in all the busbars 40U to 40W (4) The W-phase busbar 40W is located to be interposed between the V- and U-phase busbars 40V and 40U This arrangement of the U-, V-, and W-phase busbars 40U, 40V, and 40W results in 1. The V-phase busbar 40V serving as a lowermost busbar in the busbar stack assembly of the busbars 40U, 40V, and 40W 2. The W-phase busbar 40W serving as an intermediate busbar in the busbar stack assembly of the busbars 40U, 40V, and 40W 3. The U-phase busbar 40U serving as an uppermost busbar in the busbar stack assembly of the busbars 40U, 40V, and 40W Next, the following describes, in detail, an example of the configuration of the V-phase busbar 40V.

As described above, the V-phase busbar 40V has a circular-arc shape, and has opposing first and second ends in the circumferential direction thereof. The V-phase busbar 40V has a center angle of substantially 180 degrees in the circumferential direction thereof. This means that the first and second ends of the V-phase busbar 40V are circumferentially separated from each other at substantially 180 degrees.

The V-phase busbar 40V has opposing major surfaces set forth above, and opposing inner and outer peripheral surfaces.

The V-phase busbar 40V is stacked over one of the first and second faces of the back yoke 21 of the stator core 20 while the first major surface of the V-phase busbar 40V faces the one of the first and second faces of the back yoke 21 of the stator core 20.

The connection terminals 41V and 42V are mounted to the outer peripheral surface of the first end of the V-phase busbar 40V, and the connection terminals 43V and 44V are mounted to the outer peripheral surface of the second end of the V-phase busbar 40V. This means that the first pair of the connection terminals 41V and 42V and the second pair of the connection terminals 43V and 44V are circumferentially separated from each other at substantially 180 degrees, which is similar to the first and second ends of the V-phase busbar 40V.

The connection terminals 41V and 42V are circumferentially separated from each other at the angle between each adjacent pair of the slots 23. Similarly, the connection terminals 43V and 44V are circumferentially separated from each other at the angle between each adjacent pair of the slots 23.

Each of the connection terminals 41V and 42V mounted to the outer peripheral surface of the first end of the V-phase busbar 40V protrudes in a first side of the axial direction opposite to a second side thereof; the second side of the axial direction approaches the stator core 20. Similarly, each of the connection terminals 43V and 44V mounted to the outer peripheral surface of the second end of the V-phase busbar 40V protrudes toward the first side of the axial direction.

In particular, each of the connection terminals 41V to 44V is comprised of a first portion protruding radially outside the outer peripheral surface of the first end or the second end of the V-phase busbar 40V, a second portion curved to be oriented toward the first side of the axial direction, and a third portion protruding from the second portion toward the first side of the axial direction. Each of the connection terminals 41V to 44V has a joint end at its tip end of the third portion thereof. The joint end of each of the connection terminals 41V to 44V has a narrower width than a width of the remaining portion of the corresponding one of the connection terminals 41V to 44V. The first end of each of the winding sections 31V to 34V is joined to the joint end of the corresponding one of the connection terminals 41V to 44V by, for example, welding.

The V-phase busbar 40V has a middle point in the circumferential direction, and has a substantially symmetrical shape about the middle point thereof.

Next, the following describes, in detail, an example of the configuration of the W-phase busbar 40W.

As described above, the W-phase busbar 40W has a circular-arc shape, and has opposing first and second ends in the circumferential direction thereof. The W-phase busbar 40W has a center angle of substantially 180 degrees in the circumferential direction thereof. This means that the first and second ends of the W-phase busbar 40W are circumferentially separated from each other at substantially 180 degrees.

The W-phase busbar 40W has opposing major surfaces set forth above, and opposing inner and outer peripheral surfaces.

The connection terminals 41W and 42W are mounted to the outer peripheral surface of the first end of the W-phase busbar 40W, which is similar to the connection terminals 41V and 42V mounted to the outer peripheral surface of the first end of the V-phase busbar 40V. The connection terminals 43W and 44W are also mounted to the outer peripheral surface of the second end of the W-phase busbar 40W, which is similar to the connection terminals 43V and 44V mounted to the outer peripheral surface of the second end of the V-phase busbar 40V.

That is, like the V-phase busbar 40V, the first end of each of the winding sections 31W to 34W is joined to the joint end of the corresponding one of the connection terminals 41W to 44W by, for example, welding.

In particular, the W-phase busbar 40W is stacked over the V-phase busbar 40V while being shifted or offset by a predetermined angle α relative to the V-phase busbar 40V in a counterclockwise side of the circumferential direction. That is, the W-phase busbar 40W is stacked over the V-phase busbar 40V while (1) The first major surface of the W-phase busbar 40W faces the second major surface of the V-phase busbar 40V (2) The W-phase busbar 40W is shifted or offset by the predetermined angle α relative to the V-phase busbar 40V in the counterclockwise side of the circumferential direction This results in the first end of the W-phase busbar 40W being not overlaid with the V-phase busbar 40V. In other words, the first end of the W-phase busbar 40W protrudes by the predetermined angle α relative to the first end of the V-phase busbar 40V in the counterclockwise side of the circumferential direction, so that the second end of the V-phase busbar 40V protrudes by the predetermined angle α relative to the second end of the W-phase busbar 40W in a clockwise side of the circumferential direction.

Figure 6:
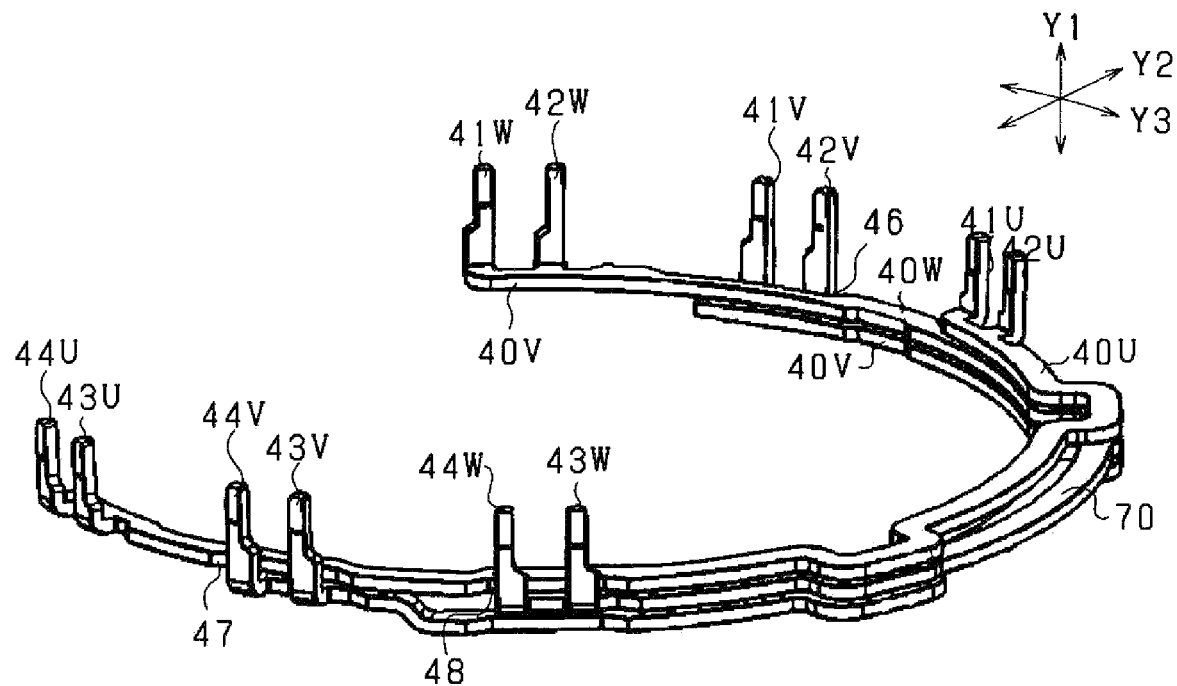
FIG. 6 is a perspective view of how the three-phase busbars are stacked.

This arrangement of the V- and W-phase busbars 40V and 40W results in, as illustrated in FIG. 6, the connection terminals 41V and 42V mounted to the first end of the V-phase busbar 40V being radially overlapped with the W-phase busbar 40W. That is, the connection terminals 41V and 42V mounted to the first end of the V-phase busbar 40V extends toward the first side of the axial direction while passing across the W-phase busbar 40W. This therefore requires secure insulation of the connection terminals 41V and 42V from the W-phase busbar 40W.

Figure 7:
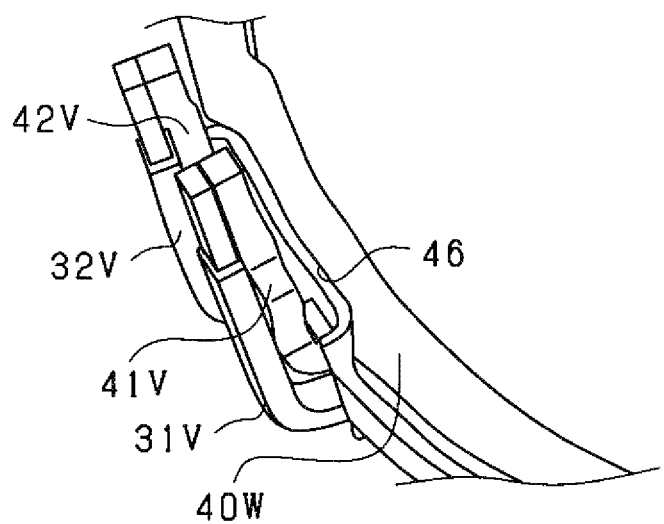
FIG. 7 is an enlarged perspective view of a part of a W-phase busbar.

From this requirement, the W-phase busbar 40W has, as illustrated in FIGS. 6 and 7, a recess 46 formed inwardly in a portion of the outer peripheral surface thereof; the portion of the outer peripheral surface of the W-phase busbar 40W faces the connection terminals 41V and 42V. The recess 46 enables the connection terminals 41V and 42V to not be in contact with, i.e., to bypass, the W-phase busbar 40W.

Because the W-phase busbar 40W is offset by the predetermined angle α relative to the V-phase busbar 40V in the counterclockwise side of the circumferential direction, the recess 46 is formed in the portion of the outer peripheral surface of the W-phase busbar 40W; the portion is offset by the predetermined angle α relative to the first end of the W-phase busbar 40W in the clockwise side of the circumferential direction or relative to the connection terminals 41W and 42W in the clockwise side of the circumferential direction.

Next, the following describes, in detail, an example of the configuration of the U-phase busbar 40U.

As described above, the U-phase busbar 40U has a circular-arc shape, and has opposing first and second ends in the circumferential direction thereof. The U-phase busbar 40U has a center angle of substantially 180 degrees in the circumferential direction thereof. This means that the first and second ends of the U-phase busbar 40U are circumferentially separated from each other at substantially 180 degrees.

The U-phase busbar 40U has opposing major surfaces set forth above, and opposing inner and outer peripheral surfaces.

The connection terminals 41U and 42U are mounted to the outer peripheral surface of the first end of the U-phase busbar 40U, which is similar to the connection terminals 41V and 42V and 41W and 42W. The connection terminals 43U and 44U are also mounted to the outer peripheral surface of the second end of the U-phase busbar 40U, which is similar to the connection terminals 43V and 44V and the connection terminals 43W and 44W.

That is, like the V-phase busbar 40V and the W-phase busbar 40W, the first end of each of the winding sections 31U to 34U is joined to the joint end of the corresponding one of the connection terminals 41U to 44U by, for example, welding.

In particular, the U-phase busbar 40U is stacked over the W-phase busbar 40V while being offset by a predetermined angle (α×2) relative to the W-phase busbar 40W in the clockwise side of the circumferential direction. That is, the U-phase busbar 40U is stacked over the W-phase busbar 40W while (1) The first major surface of the U-phase busbar 40U faces the second major surface of the W-phase busbar 40W (2) The U-phase busbar 40U is offset by the predetermined angle (α×2) relative to the W-phase busbar 40W in the clockwise side of the circumferential direction (3) The U-phase busbar 40U is offset by the predetermined angle α relative to the V-phase busbar 40V in the clockwise side of the circumferential direction The connection terminals 41V and 42V mounted to the first end of the V-phase busbar 40V located as the lowermost busbar in the axial direction are disposed between (i) the connection terminals 41W and 42W mounted to the first end of the W-phase busbar 40W located as the intermediate busbar in the axial direction and (ii) the connection terminals 41U and 42U mounted to the first end of the U-phase busbar 40U located as the uppermost busbar in the axial direction.

Similarly, the connection terminals 43V and 44V mounted to the second end of the V-phase busbar 40V located as the lowermost busbar in the axial direction are disposed between (i) the connection terminals 43W and 43W mounted to the second end of the W-phase busbar 40W located as the intermediate busbar in the axial direction and (ii) the connection terminals 43U and 44U mounted to the second end of the U-phase busbar 40U located as the uppermost busbar in the axial direction.

As illustrated in FIG. 6, this arrangement of the U-, V-, and W-phase busbars 40U, 40V, and 40W results in (1) The connection terminals 43V and 44V mounted to the second end of the V-phase busbar 40V being radially overlapped with the U-phase busbar 40U (2) The connection terminals 43W and 44W mounted to the second end of the W-phase busbar 40W being radially overlapped with the U-phase busbar 40U That is, the connection terminals 43V and 44V mounted to the second end of the V-phase busbar 40V extends toward the first side of the axial direction while passing across the U-phase busbar 40U. This therefore requires secure insulation of the connection terminals 43V and 44V from the U-phase busbar 40U. Similarly, the connection terminals 43W and 44W mounted to the second end of the W-phase busbar 40W extends toward the first side of the axial direction while passing across the U-phase busbar 40U. This therefore requires secure insulation of the connection terminals 43W and 44W from the U-phase busbar 40U.

From these requirements, the U-phase busbar 40U has, as illustrated in FIGS. 1 and 4, a recess 47 formed inwardly in a portion of the outer peripheral surface thereof; the portion of the outer peripheral surface of the U-phase busbar 40U faces the connection terminals 43V and 44V. The recess 47 enables the connection terminals 43V and 44V to not be in contact with, i.e., to bypass, the U-phase busbar 40U.

Because the U-phase busbar 40U is offset by the predetermined angle α relative to the V-phase busbar 40V in the clockwise side of the circumferential direction, the recess 47 is formed in the portion of the outer peripheral surface of the U-phase busbar 40U; the portion is offset by the predetermined angle α relative to the second end of the U-phase busbar 40U in the counterclockwise side of the circumferential direction or relative to the connection terminals 43U and 44U in the counterclockwise side of the circumferential direction.

Similarly, the U-phase busbar 40U has, as illustrated in FIGS. 1 and 4, a recess 48 formed inwardly in a portion of the outer peripheral surface thereof; the portion of the outer peripheral surface of the U-phase busbar 40U faces the connection terminals 43W and 44W. The recess 48 enables the connection terminals 43W and 44W to not be in contact with, i.e., to bypass, the U-phase busbar 40U.

Because the U-phase busbar 40U is offset by the predetermined angle (α×2) relative to the W-phase busbar 40W in the clockwise side of the circumferential direction, the recess 48 is formed in the portion of the outer peripheral surface of the U-phase busbar 40U; the portion is offset by the predetermined angle (α×2) relative to the second end of the U-phase busbar 40U in the counterclockwise side of the circumferential direction or relative to the connection terminals 43U and 44U in the counterclockwise side of the circumferential direction.

As described above, the V-phase busbar 40V, the W-phase busbar 40W, and the U-phase busbar 40U are stacked in this order over the second end face of the back yoke 21 of the stator core 20 while being circumferentially offset by the respective predetermined angles.

This results in a part of the second end of the V-phase busbar 40V located as the lowermost busbar in the axial direction directly facing the second end of the U-phase busbar 40U located as the upper most busbar in the axial direction while no portion of the W-phase busbar 40W located as the intermediate busbar is interposed therebetween. If the second end of the V-phase busbar 40V were flat in the circumferential direction, there would be a relatively long distance between the part of the second end of the V-phase busbar 40V and the second end of the U-phase busbar 40U in the axial direction.

From this viewpoint, the part of the second end of the V-phase busbar 40V, which directly faces the U-phase busbar 40U, is bent to be closer to the U-phase busbar 40U. This enables the distance between the part of the second end of the V-phase busbar 40V and the second end of the U-phase busbar 40U in the axial direction to be smaller.

Next, the following describes, in detail, an example of the configuration of the neutral busbar set 45.

As described above, the neutral busbar set 45 is comprised of, as illustrated in FIG. 4, the first neutral busbar 451 and the second neutral busbar 452, and each of the first and second neutral busbars 451 and 452 has a circular-arc shape, and has (i) opposing major surfaces, and (ii) opposing first and second ends in the circumferential direction thereof.

Each of the first and second neutral busbars 451 and 452 has a shorter length than each of the U-, V-, and W-phase busbars 40U, 40V, and 40W in the circumferential direction. For example, the length of each of the first and second neutral busbars 451 and 452 in the circumferential direction corresponds to the predetermined angle (α×2).

The first neutral busbar 451 and the second neutral busbar 452 are dispersedly arranged in the circumferential direction.

The first neutral busbar 451 is arranged over the U-phase busbar 40U while the first end of the first neutral busbar 451 slightly protrudes relative to the first end of the W-phase busbar 40W in the circumferential direction. Specifically, the first neutral busbar 451 is offset by a predetermined angle relative to the W-phase busbar 40W, which protrudes farthest in all the busbars 40U, 40V, and 40W, in the counterclockwise side of the circumferential direction.

The second neutral busbar 452 is arranged over the U-phase busbar 40U while facing the first neutral busbar 451, i.e., while being offset by substantially 180 degrees in the circumferential direction.

The motor 1 includes six connection terminals 51 that are joined to the second ends of the respective winding sections 31U, 32U, 31V, 32V, 31W, and 32W, which are opposite to the first ends of the respective winding sections 31U, 32U, 31V, 32V, 31W, and 32W connected to the respective busbars 40U, 40V, and 40W.

The six connection terminals 51 include a first pair of connection terminals 51 for the U-phase winding sections 31U and 32U, a second pair of connection terminals 51 for the V-phase winding sections 31V and 32V, and a third pair of connection terminals 51 for the W-phase winding sections 31W and 32W. The first pair of connection terminals 51, the second pair of connection terminals 51, and the third pair of connection terminals 51 are offset relative to one another in the circumferential direction with the angular intervals of a degrees apart from one another.

The connection terminals 51 of each of the first to third pairs are mounted to the inner peripheral surface of the first neutral busbar 451 while protruding toward the first side of the axial direction. In particular, each of the connection terminals 51 is comprised of a first portion protruding radially inside the inner peripheral surface of the first neutral busbar 451, a second portion curved to be oriented toward the first side of the axial direction, and a third portion protruding from the second portion toward the first side of the axial direction.

Each of the connection terminals 51 has a joint end at its tip end of the third portion thereof. The joint end of each of the connection terminals 51 of the first pair is joined to the second end of a corresponding one of the U-phase winding sections 31U and 32U by, for example, welding.

Similarly, the joint end of each of the connection terminals 51 of the second pair is joined to the second end of a corresponding one of the V-phase winding sections 31V and 32V by, for example, welding, and the joint end of each of the connection terminals 51 of the third pair is joined to the second end of a corresponding one of the W-phase winding sections 31W and 32W by, for example, welding.

The first neutral busbar 451 has a first portion, which will be referred to as a first overlap portion, that is radially overlapped with the connection terminals 41W and 42W of the W-phase busbar 40W. This therefore requires secure insulation of the first overlap portion of the first neutral busbar 451 from the connection terminals 41W and 42W.

From this requirement, the first neutral busbar 451 has, as illustrated in FIGS. 1 and 4, a recess 53a formed inwardly in the first overlap portion of the outer peripheral surface thereof; the first overlap portion of the outer peripheral surface of the first neutral busbar 451 faces the connection terminals 41W and 42W. The recess 53a enables the connection terminals 41W and 42W to not be in contact with, i.e., to bypass, the first neutral busbar 451.

Similarly, the first neutral busbar 451 has a second portion, which will be referred to as a second overlap portion, that is radially overlapped with the connection terminals 41V and 42V of the V-phase busbar 40V. This therefore requires secure insulation of the second overlap portion of the first neutral busbar 451 from the connection terminals 41V and 42V.

From this requirement, the first neutral busbar 451 has, as illustrated in FIGS. 1 and 4, a recess 53b formed inwardly in the second overlap portion of the outer peripheral surface thereof; the second overlap portion of the outer peripheral surface of the first neutral busbar 451 faces the connection terminals 41V and 42V. The recess 53b enables the connection terminals 41V and 42V to not be in contact with, i.e., to bypass, the first neutral busbar 451.

The motor 1 includes six connection terminals 52 that are joined to the second ends of the respective winding sections 33U, 34U, 33V, 34V, 33W, and 34W, which are opposite to the first ends of the respective winding sections 33U, 34U, 33V, 34V, 33W, and 34W connected to the respective busbars 40U, 40V, and 40W.

The six connection terminals 52 include a first pair of connection terminals 52 for the U-phase winding sections 33U and 34U, a second pair of connection terminals 52 for the V-phase winding sections 33V and 34V, and a third pair of connection terminals 52 for the W-phase winding sections 33W and 34W. The first pair of connection terminals 52, the second pair of connection terminals 52, and the third pair of connection terminals 52 are offset relative to one another in the circumferential direction with the angular intervals of a degrees apart from one another.

The connection terminals 52 of each of the first to third pairs are mounted to the inner peripheral surface of the second neutral busbar 452 while protruding toward the first side of the axial direction in the same manner as the connection terminals 51 mounted to the first neutral busbar 451.

In particular, the second neutral busbar 452 is circumferentially separated from the first neutral busbar 451 while the connection terminals 52 of the second neutral busbar 452 are symmetrical to the first connection terminals 51 of the first neutral busbar 452 about the center axis Y1.

The second neutral busbar 452 has a first portion, which will be referred to as a first overlap portion, that is radially overlapped with the connection terminals 43W and 44W of the W-phase busbar 40W. This therefore requires secure insulation of the first overlap portion of the second neutral busbar 452 from the connection terminals 43W and 44W. From this requirement, the second neutral busbar 452 has, as illustrated in FIGS. 1 and 4, a recess 53c formed inwardly in the first overlap portion of the outer peripheral surface thereof; the first overlap portion of the outer peripheral surface of the second neutral busbar 452 faces the connection terminals 43W and 44W. The recess 53c enables the connection terminals 43W and 44W to not be in contact with, i.e., to bypass, the second neutral busbar 452.

The second neutral busbar 452 also has a second portion, which will be referred to as a second overlap portion, that is radially overlapped with the connection terminals 43V and 44V of the V-phase busbar 40V. This therefore requires secure insulation of the second overlap portion of the second neutral busbar 452 from the connection terminals 43V and 44V. From this requirement, the second neutral busbar 452 has, as illustrated in FIGS. 1 and 4, a recess 53d formed inwardly in the second overlap portion of the outer peripheral surface thereof; the second overlap portion of the outer peripheral surface of the second neutral busbar 452 faces the connection terminals 43V and 44V. The recess 53d enables the connection terminals 43V and 44V to not be in contact with, i.e., to bypass, the second neutral busbar 452.

The motor 1 additionally includes a resin package 60 that encapsulates the busbar stack assembly comprised of the busbars 40U, 40V, 40W, 451, and 452, so that an integrally packaged busbar stack assembly is constructed as the busbar unit 40.

Figure 5:
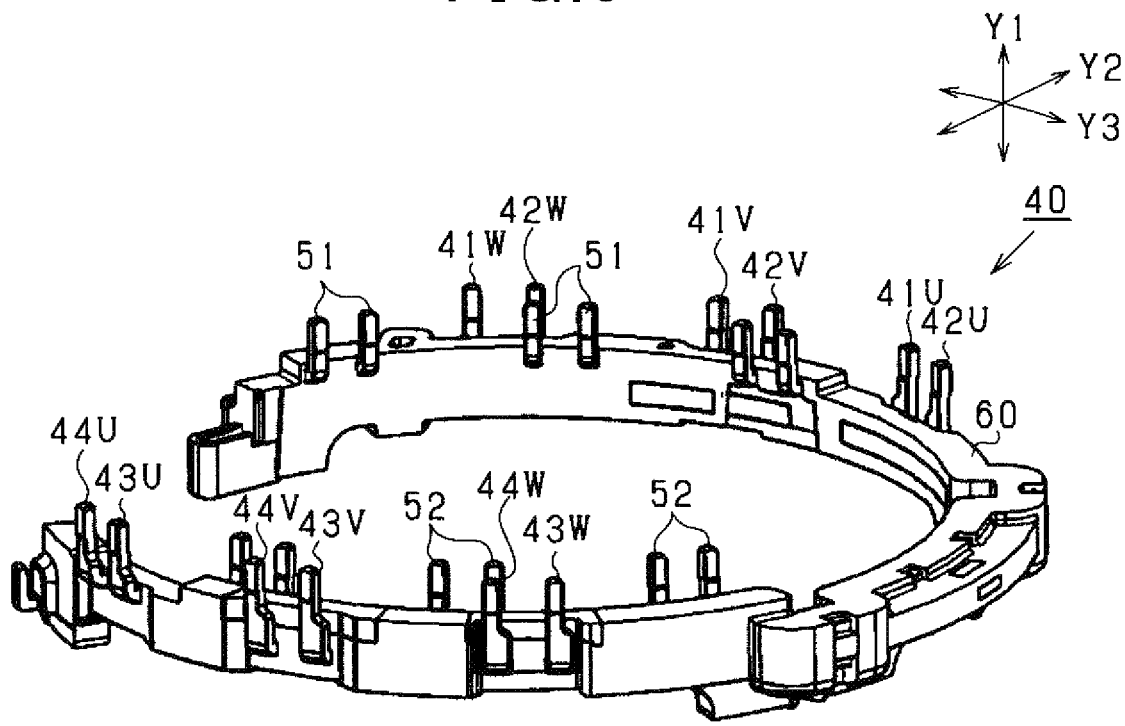
FIG. 5 is a perspective view of a busbar unit.

As illustrated in FIG. 5, the resin package 60 covers the busbar stack assembly comprised of the busbars 40U, 40V, 40W, 451, and 452 while the connection terminals 41U to 44U, 41V to 44V, 41W to 44W, 51, and 52 are exposed from the resin package 60. That is, the connection terminals 41U to 44U, 41V to 44V, 41W to 44W, 51, and 52 protrude, from the inside of the resin package 60, toward the radial inside or radial outside of the resin package 60, and the joint end of the protruded portion of each of the connection terminals 41U to 44U, 41V to 44V, 41W to 44W, 51, and 52 extends toward the first side of the axial direction.

For example, the resin package 60 has a circular arc shape that is in conformity with the busbar stack assembly comprised of the busbars 40U, 40V, 40W, 451, and 452. This enables the resin package 60 to encapsulate the busbar stack assembly comprised of the busbars 40U, 40V, 40W, 451, and 452.

In particular, the resin package 60 covers the busbar stack assembly comprised of the busbars 40U, 40V, 40W, 451, and 452 while surrounding each of the busbars 40U, 40V, 40W, 451, and 452. That is, the resin package 60 covers the busbar stack assembly while 1. A first part of the resin package 60 is interposed between the V-phase busbar 40V and the W-phase busbar 40W adjacently aligned in the axial direction to accordingly maintain a sufficient distance between the V-phase busbar 40V and the W-phase busbar 40W 2. A second part of the resin package 60 is interposed between the U-phase busbar 40U and the W-phase busbar 40W adjacently aligned in the axial direction to accordingly maintain a sufficient distance between the U-phase busbar 40U and the W-phase busbar 40W 3. A third part of the resin package 60 is interposed between the first neutral busbar 451 and the U-phase busbar 40U adjacently aligned in the axial direction to accordingly maintain a sufficient distance between the first neutral busbar 451 and the U-phase busbar 40U 4. A fourth part of the resin package 60 is interposed between the second neutral busbar 452 and the U-phase busbar 40U adjacently aligned in the axial direction to accordingly maintain a sufficient distance between the second neutral busbar 452 and the U-phase busbar 40U This results in secure electrical insulation between the axially adjacent busbars of the busbar stack assembly.

Next, the following describes a method of manufacturing the busbar unit 40.

Figure 8:
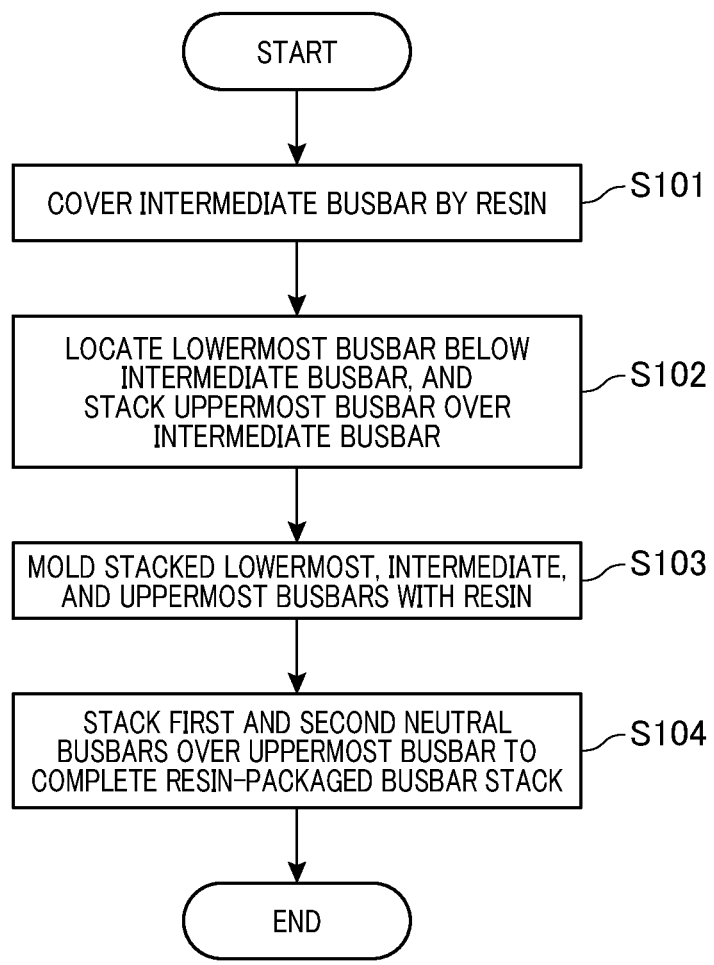
FIG. 8 is a flowchart schematically illustrating a method of manufacturing a busbar unit.
Figure 9:
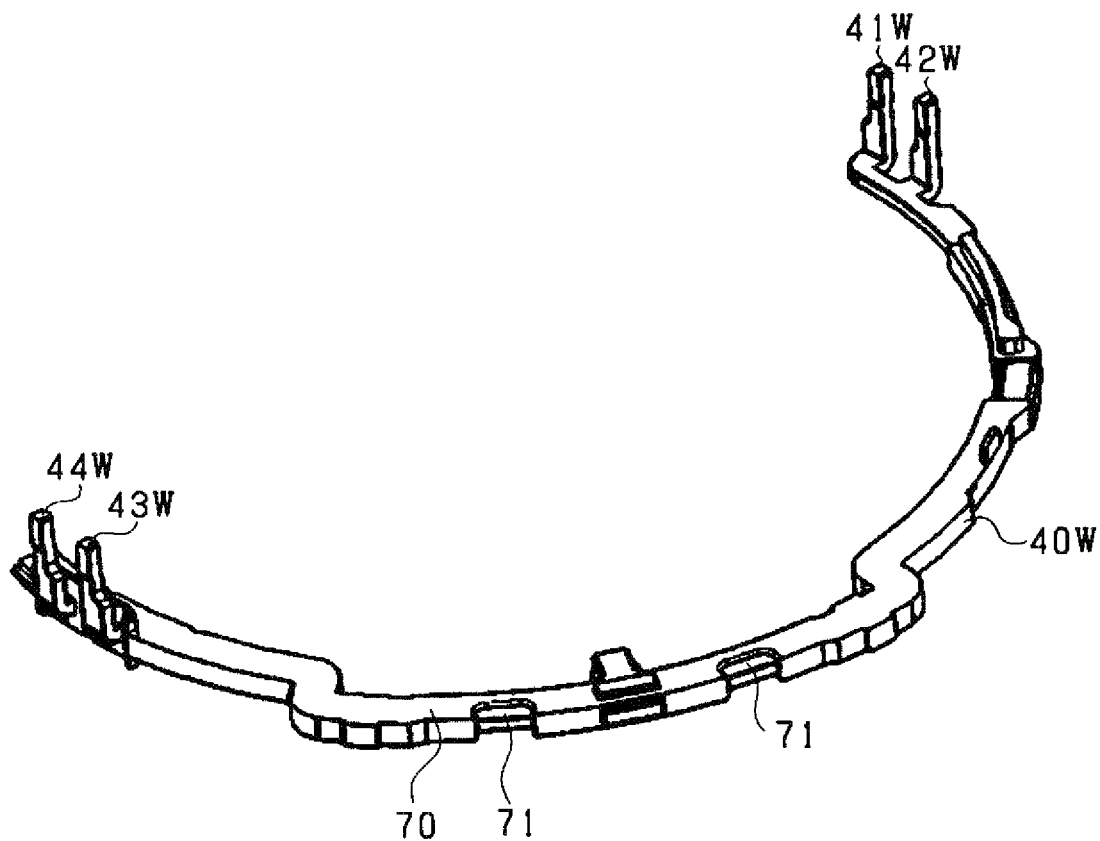
FIG. 9 is a perspective view of the W-phase busbar after a first step of the method.
Figure 10:
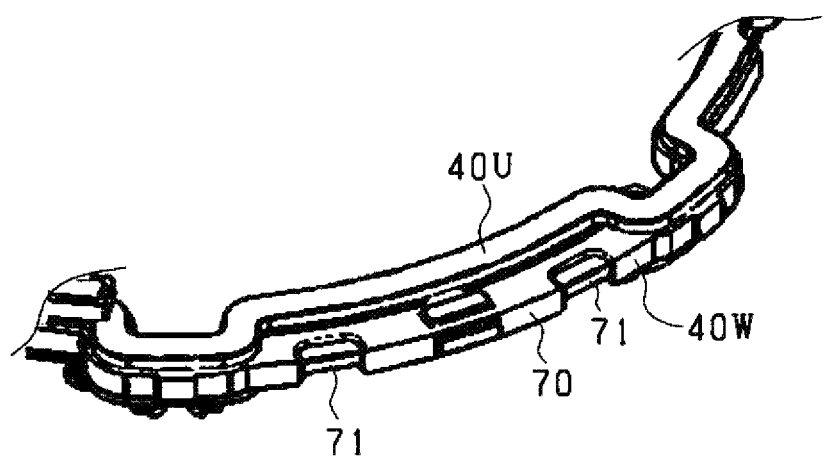
FIG. 10 is a perspective view of the W-phase busbar after a second step of the method.

The method includes, as illustrated in FIG. 8, a first step S101 of covering the W-phase busbar 40W, which serves as the intermediate busbar, with resin in a mold while the W-phase busbar 40W is stationarily supported in the mold.

Next, the method includes a second step S102 of (1) Locating, below the resin-covered W-phase busbar 40W in the mold, the V-phase busbar 40V serving as the lowermost busbar (2) Stacking, over the resin-covered W-phase busbar 40W in the mold, the U-phase busbar 40U serving as the uppermost busbar.

In the second step S102, the locating process (1) and the stacking process (2) can be carried out in random order.

In particular, the second step S102 locates, below the resin-covered W-phase busbar 40W, the V-phase busbar 40W while the V-phase busbar 40V is offset by the predetermined angle α relative to the resin-covered W-phase busbar 40W in the clockwise side of the circumferential direction of the resin-covered W-phase busbar 40W.

In addition, the second step S102 stacks, over the resin-covered W-phase busbar 40W, the U-phase busbar 40U while the U-phase busbar 40U is offset by the predetermined angle (α×2) relative to the W-phase busbar 40W in the clockwise side of the circumferential direction.

Nest, the method includes a third step S103 of covering the stacked busbars 40V, 40W, and 40U with resin in the mold to accordingly enclose the stacked busbars 40V, 40W, and 40U with the resin, thus integrally packaging the stacked busbars 40V, 40W, and 40U with the resin.

Subsequently, the method includes a fourth step S104 of (1) Arranging the first neutral busbar 451 over the U-phase busbar 40U of the resin-covered busbars 40V, 40W, and 40U in the mold while the first end of the first neutral busbar 451 slightly protrudes relative to the first end of the W-phase busbar 40W in the circumferential direction (2) Arranging the second neutral busbar 452 over the U-phase busbar 40U of the resin-covered busbars 40V, 40W, and 40U in the mold while the second neutral busbar 452 faces the first neutral busbar 451, i.e., while the second neutral busbar 452 is offset by substantially 180 degrees relative to the first neutral busbar 451 in the circumferential direction (3) Covering, with resin, the resin-covered busbars 40V, 40W, and 40U over which the first and second neutral busbars 451 and 452 are stacked in the mold, thus integrally encapsulating the stacked busbars 40V, 40W, and 40U in a resin package 60, thus completing the resin-packaged busbar stack as the busbar unit 40 in step S104

Note that the above method covers the stacked busbars 40V, 40W, and 40U with resin in the mold to accordingly enclose the stacked busbars 40V, 40W, and 40U with the resin in step S103, and thereafter arranges the first and second neutral busbars 451 and 452 over the U-phase busbar 40U of the resin-covered busbars 40V, 40W, and 40U in the mold in step S104, but the present disclosure is not limited thereto.

Specifically, following the second step S102, the method can arrange the first and second neutral busbars 451 and 452 over the U-phase busbar 40U of the stacked busbars 40V, 40W, and 40U in the mold in the third step S103, and thereafter, cover, with resin, the stacked busbars 40V, 40W, 40U, 451, and 452 in the mold while at least a part of the resin is interposed between each axially adjacent pair of busbars 40V, 40W, 40U, 451, and 452, thus integrally encapsulating the stacked busbars 40V, 40W, and 40U in a resin package 60.

When molding the entire surface of the W-phase busbar 40W with resin in the mold in the first step S101, the method supports, by a support member, at least one part of the W-phase busbar 40W in a stationary state in the mold. For this reason, the at least one part of the W-phase busbar 40, which is supported by the hold member, is not covered with resin in the first step S101.

If the stacked busbars 40V, 40W, and 40U were molded by resin in the third step S103 while the at least one supported part, i.e., the at least one exposed part, of the W-phase busbar 40W faces the U-phase busbar 40U stacked over the W-phase busbar 40W or faces the V-phase busbar 40V located below the W-phase busbar 40W, there might be a defect, such as a void and/or a peeling resin, in the at least one supported part of the W-phase busbar 40W. This might result in insufficient insulation being likely to occur at the at least one supported part of the W-phase busbar 40W.

From this viewpoint, as illustrated in, for example, FIG. 6, the motor 1 includes a protrusion member 70 protruding radially outward from the W-phase busbar 40W according to the exemplary embodiment. The protrusion member 70 can constitute the stator 10.

That is, when the U-phase busbar 40U is stacked over the W-phase busbar 40W with the V-phase busbar 40V located below the W-phase busbar 40W to constitute the busbar stack assembly, no busbars are located over and below at least one part of the protrusion member 70 in the axial direction. For example, the protrusion member 70 is mounted to a middle portion of the W-phase busbar 40W positioned between the first and second ends in the circumferential direction.

While at least one part of the protrusion member 70 is supported by the support member, the first step molds the entire surface of the W-phase busbar 40W with resin in the mold in the first step S101. This makes it possible to sufficiently separate the at least one supported part (exposed part) of the protrusion member 70 supported by the support member from the upper most busbar 40U and the lowermost busbar 40V that are respectively arranged over and below the W-phase busbar 40W in the second step S102.

For example, the resin molding in the first step S101 is carried out while two parts of the protrusion member 70 are supported by the support member, so that, after the first step S101, two exposed parts 71 respectively corresponding to the supported parts are formed on the W-phase busbar 40W. For example, parts of a radially outer portion of the protrusion member 70 are supported by the support member according to the exemplary embodiment, the exposed parts 71 are formed on the protruding end (radially outer portion) of the protrusion member 70.

In the second step S102, the exposed parts 71 of the protrusion member 70 of the W-phase busbar 40W are radially offset with respect to the uppermost U-phase busbar 40U and the lower most V-phase busbar 40V. This results in the exposed parts 71 of the protrusion member 70 of the W-phase busbar 40W being nonoverlapped with the uppermost and lowermost busbars 40U and 40V in the axial direction.

When the busbar stack member comprised of the busbars 40U, 40W, and 40V with the exposed parts 71 of the busbar 40W being nonoverlapped with the uppermost and lowermost busbars 40U and 40V in the axial direction is molded by resin in the mold in the third step S103, the exposed parts 71 of the busbar 40W are covered with resin. Because the exposed parts 71 of the protrusion member 70 are located to radially protrude from the W-phase busbar 40W, it is possible to ensure a radially sufficient distance between each exposed part 71 of the protrusion member 70 and the uppermost and lowermost busbars 40U and 40V.

The exemplary embodiment set forth above achieves the following advantageous benefits.

The method of manufacturing the busbar unit 40 according to the exemplary embodiment covers, by resin, only the W-phase busbar 40W while supporting at least one part of the W-phase busbar 40W by a support member in the first step S101. Next, the method locates the V-phase busbar 40V below the W-phase busbar 40W, and stacks the U-phase busbar 40U over the W-phase busbar 40W in the second step S102. Then, the method covers the stacked busbars 40V, 40W, and 40U with resin to accordingly enclose the stacked busbars 40V, 40W, and 40U with the resin, thus integrally packaging the stacked busbars 40V, 40W, and 40U with the resin. This makes it easier to stack the busbars 40V, 40W, and 40U, and mold the stacked busbars 40V, 40W, and 40U with resin.

The above method results in the at least one part of the W-phase busbar 40, which is supported by the hold member, being not covered with resin in the first step S101. That is, the first step S101 inescapably results in at least one exposed part of the intermediate W-phase busbar 40W.

If the at least one exposed part of the W-phase busbar 40W were axially interposed between the U-phase busbar 40U and the V-phase busbar 40V, there might be a risk of insufficient insulation being likely to occur at the at least one exposed part of the W-phase busbar 40W.

This is because, when the at least one exposed part of the W-phase busbar 40W adjacently facing the uppermost U-phase busbar 40U and lowermost V-phase busbar 40V, resin might be not sufficiently filled between the busbars 40U and 40W, and/or between the busbars 40W and 40V in the third step S103 of molding the whole of the busbar stack assembly comprised of busbars 40U, 40W, and 40V. In addition, the at least one exposed part of the W-phase busbar 40W might be adjacent to the uppermost U-phase busbar 40U and lowermost V-phase busbar 40V.

For addressing such issues, the motor 1 includes the protrusion member 70 mounted to the intermediate W-phase busbar 40W and located to be axially nonoverlapped with the uppermost U-phase busbar 40U and the lowermost V-phase busbar 40V in the axial direction.

While at least one part of the protrusion member 70 is supported by the support member, the first step molds the entire surface of the W-phase busbar 40W with resin in the mold in the first step S101. This makes it possible to (1) Sufficiently separate the at least one supported part (exposed part) of the protrusion member 70 supported by the support member from the uppermost busbar 40U and the lowermost busbar 40V that are respectively arranged over and below the W-phase busbar 40W in the second step S102

(2) Reliably cover the at least one exposed part with resin in the third step S103

The busbar unit 70 is comprised of the resin-covered intermediate W-phase busbar 40W, the uppermost U-phase busbar 40U stacked over the W-phase busbar 40W, the lowermost V-phase busbar 40V located below the W-phase busbar 40V, and the resin package 60 that integrally covers the stacked busbars 40U, 40W, and 40V. This enables electrical insulation of the busbar unit 70 to be reliably carried out by resin. Because the resin package 60 that integrally encloses the whole of the stacked busbars 40U, 40W, and 40V, it is possible to maintain a proper distance between each adjacent pair of the busbars 40U, 40V, and 40W in the axial direction.

The W-phase busbar 40W is covered with resin while at least one radially outer part of the protrusion member 70 is supported by the support member. This enables the at least one supported part, which is the at least one exposed part 71, to be sufficiently separated from each of the uppermost U-phase busbar 40U and the lowermost V-phase busbar 40W.

The busbar unit 40 has overall a circular-arc shape. For this reason, if one of the first and second ends of the W-phase busbar 40W in the circumferential direction is far away from the protrusion member 70, the one of the first and second ends of the W-phase busbar 40W in the circumferential direction may become bent or wobble due to its weight, resulting in difficulty of maintaining, at a substantially constant value, the distance between each adjacent pair of the busbars 40U, 40W, and 40V. In particular, when the busbar unit 40 is manufactured using resign molding, molded resin may press one of the first and second ends of the W-phase busbar 40W in the circumferential direction, resulting in the one of the first and second ends of the W-phase busbar 40W being easily bent.

From this viewpoint, the protrusion member 70 to be supported by the support member is mounted to a middle portion of the W-phase busbar 40W positioned between the first and second ends in the circumferential direction. This enables a shorter distance between at least one supported part of the protrusion member 70 and each of the first and second ends of the W-phase busbar 40W as compared with a case where the protrusion member 70 is mounted to one of the first and second ends of the W-phase busbar 40W.

The method covers the W-phase busbar 40W with resin while supporting at least one part of the protrusion member 70 in the first step S101, making it possible to cover the W-phase busbar 40W with resin while preventing each of the first and second ends thereof from being bent or wobbling. This therefore enables the W-phase busbar 40W to be covered with resin as designed, making it possible to maintain a proper distance between each adjacent pair of the busbars 40U, 40V, and 40W in the axial direction.

The busbar unit 40 is comprised of the respective-phase busbars 40U, 40V, and 40W that are stacked while being circumferentially offset to one another by respective predetermined angles, so that (1) The pair of the connection terminals 41V and 42V of the first end of the lowermost V-phase busbar 40V is located between the pair of connection terminals 41U and 42U of the first end of the uppermost U-phase busbar 40U and the pair of connection terminals 41W and 42W of the first end of the intermediate W-phase busbar 40W in the circumferential direction (2) The pair of the connection terminals 43V and 44V of the second end of the lowermost V-phase busbar 40V is located between the pair of connection terminals 43U and 44U of the first end of the uppermost U-phase busbar 40U and the pair of connection terminals 43W and 44W of the first end of the intermediate W-phase busbar 40W in the circumferential direction This arrangement enables the pair of connection terminals 41V and 42V of the first end of the V-phase busbar 40V to extend toward the first side of the axial direction while passing across only the W-phase busbar 40W, and enables the pair of connection terminals 43V and 44V of the second end of the V-phase busbar 40V to extend toward the first side of the axial direction while passing across only the U-phase busbar 40U.

This therefore eliminates the need for the connection terminals 41V to 44V to pass across both the uppermost U-phase busbar 40U and the intermediate W-phase busbar 40W in the axial direction. This enables arrangement of the connection terminals 41V to 44V while electrical insulation to any one of the uppermost U-phase busbar 40U and the intermediate W-phase busbar 40W is ensured. This makes it possible to perform electrical insulation of the connection terminals 41V to 44V more easily.

The U-phase busbar 40U has the recess 47 formed inwardly in a portion of the outer peripheral surface thereof; the portion of the outer peripheral surface of the U-phase busbar 40U faces the connection terminals 43V and 44V. The recess 47 enables the connection terminals 43V and 44V to not be in contact with, i.e., to bypass, the U-phase busbar 40U. This reliably ensures electrical insulation of the connection terminals 43V and 44V from the U-phase busbar 40U without the need of causing the connection terminals 43V and 44V to protrude radially outward by a large distance for reliable prevention of connection to the U-phase busbar 40U, making it possible for the busbar unit 40 to have a smaller size.

Similarly, the U-phase busbar 40U has the recess 48 formed inwardly in a portion of the outer peripheral surface thereof; the portion of the outer peripheral surface of the U-phase busbar 40U faces the connection terminals 43W and 44W. The recess 48 enables the connection terminals 43W and 44W to not be in contact with, i.e., to bypass, the U-phase busbar 40U. This reliably ensures electrical insulation of the connection terminals 43W and 44W from the U-phase busbar 40U without the need of causing the connection terminals 43W and 44W to protrude radially outward by a large distance for reliable prevention of connection to the U-phase busbar 40U, making it possible for the busbar unit 40 to have a smaller size.

Additionally, the W-phase busbar 40W has the recess 46 formed inwardly in a portion of the outer peripheral surface thereof; the portion of the outer peripheral surface of the W-phase busbar 40W faces the connection terminals 41V and 42V. The recess 46 enables the connection terminals 41V and 42V to not be in contact with, i.e., to bypass, the W-phase busbar 40W. This reliably ensures electrical insulation of the connection terminals 41V and 42V from the W-phase busbar 40W without the need of causing the connection terminals 41V and 42V to protrude radially outward by a large distance for reliable prevention of connection to the W-phase busbar 40W, making it possible for the busbar unit 40 to have a smaller size.

The connection terminals 51 of each of the first to third pairs for the first neutral busbar 451 are mounted to the inner peripheral surface of the first neutral busbar 451. Similarly, the connection terminals 52 of each of the first to third pairs for the second neutral busbar 452 are mounted to the inner peripheral surface of the second neutral busbar 452.

This therefore makes it possible to separate joint portions between the connection terminals 51 and 52 and the second ends of the winding sections at the radial inside of the busbar unit 40 from joint portions between the connection terminals 41U to 44U, 41V to 44V, and 41W to 44W and the first ends of the winding sections at the radial outside of the busbar unit 40. This enables the busbar unit 40 and the stator coil 30 to be more firmly joined to each other as compared with joint portions between the busbar unit 40 and the stator coil 30 being located at only one of the radial inside and radial outside of the busbar unit 40.

A part of the configuration of the exemplary embodiment set forth above can be modified as follows.

The three-phase busbars 40U, 40V, and 40W and the neutral busbar set 45 are integrated with each other to constitute the busbar stack assembly according to the exemplary embodiment, but the neutral busbar set 45 cannot be integrated with the busbar stack of the three-phase busbars 40U, 40V, and 40W.

The protrusion member 70, which is mounted to the middle portion of the W-phase busbar 40W positioned between the first and second ends of the W-phase busbar 40W in the circumferential direction, can be mounted to one of the first and second ends of the W-phase busbar 40W in the circumferential direction.

The order of stack of the three-phase busbars 40U, 40V, and 40W in the axial direction can be freely changed. The three-phase busbars 40U, 40V, and 40W can be stacked in the axial direction without being offset relative to one another in the circumferential direction.

The connection terminals 41U to 44U can be mounted to the inner peripheral surface of the U-phase busbar 40U, the connection terminals 41V to 44V can be mounted to the inner peripheral surface of the V-phase busbar 40V, and the connection terminals 41W to 44W can be mounted to the inner peripheral surface of the W-phase busbar 40W.

The connection terminals 41U to 44U can be separately mounted to both the inner and outer peripheral surfaces of the U-phase busbar 40U, the connection terminals 41V to 44V can be separately mounted to both the inner and outer peripheral surfaces of the V-phase busbar 40V, and the connection terminals 41W to 44W can be separately mounted to both the inner and outer peripheral surfaces of the W-phase busbar 40W. This enables the busbar unit 40 to have a smaller size, and the busbar unit 40 and the stator coil 30 to be more firmly joined to each other.

The U-phase busbar 40U can have no recesses 47 and 48 for causing the connection terminals 43V and 44V and 43W and 44W to bypass the U-phase busbar 40U. The W-phase busbar 40W can have no recess 46 for causing the connection terminals 41V and 42V to bypass the W-phase busbar 40W.

The motor serving as a rotary electric machine according to the exemplary embodiment is used as a vehicular motor-generator, but is not limited to such a vehicular motor-generator. For example, the motor serving as a rotary electric machine can be used as a motor for another machine, such as an airplane.

While the illustrative embodiment and its modifications of the present disclosure have been described herein, the present disclosure is not limited to the exemplary embodiment and its modifications described herein.

Specifically, the present disclosure includes any and all embodiments having modifications, omissions, combinations (e.g., of aspects across various embodiments), adaptations and/or alternatives as would be appreciated by those in the art based on the present disclosure. The limitations in the claims are to be interpreted broadly based on the language employed in the claims and not limited to examples described in the present specification or during the prosecution of the application, which examples are to be construed as non-exclusive.

What is claimed is:

1. A rotary electric machine comprising:
an armature that comprises an armature core and first-, second-, and third-phase armature windings wound at least around the armature core;
a magnetic field generator that generates a magnetic field;
a busbar unit that comprises:
at least first-, second-, and third-phase busbars electrically connected to the respective first-, second-, and third-phase armature windings,
the first-phase busbar serving as a lowermost busbar located to face the armature core in an axial direction,
the second-phase busbar serving as an intermediate busbar stacked over the lowermost busbar in the axial direction, and
the third-phase busbar serving as an uppermost busbar stacked over the intermediate busbar in the axial direction so that the lowermost busbar, the intermediate busbar, and the uppermost busbar are stacked in the axial direction; and
a resin member that covers the lowermost busbar, the intermediate busbar, and the uppermost busbar stacked in the axial direction so that the lowermost busbar, the intermediate busbar, and the uppermost busbar are integrated to constitute a busbar stack; and
a protrusion member mounted to the intermediate busbar and protruding radially outward from the intermediate busbar, at least part of the protrusion member being located so as to be nonoverlapped with the uppermost busbar and the lowermost busbar in the axial direction, wherein:
the intermediate busbar is covered with first resin;
at least part of the protrusion member is an exposed part that is non-covered with the first resin;
the exposed part of the protrusion member is radially offset with respect to the uppermost busbar and the lowermost busbar; and
the resin member is a second resin that covers the uppermost busbar, the resin-covered intermediate busbar and the exposed part, and the lowermost busbar.

2. The rotary electric machine according to claim 1, wherein:
  each of the lowermost busbar, the intermediate busbar, and the uppermost busbar has a circular-arc shape;
  each of the lowermost busbar, the intermediate busbar, and the uppermost busbar has opposing first and second ends and a middle portion positioned between the first and second ends; and
  the protrusion member is mounted to the middle portion of the intermediate busbar.

3. The rotary electric machine according to claim 1, wherein:
  each of the first-, second-, and third-phase armature windings has opposing first and second ends;
  each of the lowermost busbar, the intermediate busbar, and the uppermost busbar has a circular-arc shape;
  each of the lowermost busbar, the intermediate busbar, and the uppermost busbar has opposing first and second ends;
  the rotary electric machine further comprises:
    at least one first connection terminal mounted to at least the first end of the lowermost busbar and connected to the first end of the first-phase armature winding;
    at least one second connection terminal mounted to at least the first end of the intermediate busbar and connected to the first end of the second-phase armature winding; and
    at least one third connection terminal mounted to the first end of the uppermost busbar and connected to the first end of the third-phase armature winding;
  each of the at least one first connection terminal, the at least one second connection terminal, and the at least one third connection terminal is configured to extend in a first side of the axial direction opposite to a second side thereof, the second side of the axial direction approaching the armature core; and
  the lowermost busbar, the intermediate busbar, and the uppermost busbar are stacked in the axial direction while being offset relative to one another by respective predetermined angles in a circumferential direction of the armature core so that
    the at least one first connection terminal mounted to the first end of the lowermost busbar is located between the at least one second connection terminal mounted to the first end of the intermediate busbar and the at least one third connection terminal mounted to the first end of the uppermost busbar in the circumferential direction.

4. The rotary electric machine according to claim 3, wherein:
  the at least one first connection terminal comprises a plurality of first connection terminals mounted respectively to the outer peripheral surface of at least the first end of the lowermost busbar;
  the at least one second connection terminal comprises a plurality of second connection terminals mounted respectively to the outer peripheral surface of at least the first end of the intermediate busbar; and
  the at least one third connection terminal comprises a plurality of third connection terminals mounted respectively to the outer peripheral surface of at least the first end of the uppermost busbar.

5. The rotary electric machine according to claim 1, wherein:
  each of the first-, second-, and third-phase armature windings has opposing first and second ends;
  each of the lowermost busbar, the intermediate busbar, and the uppermost busbar has a circular-arc shape;
  each of the lowermost busbar, the intermediate busbar, and the uppermost busbar has opposing first and second ends;
  the rotary electric machine further comprises:
    at least one first connection terminal mounted to an inner peripheral surface or an outer peripheral surface of at least the first end of the lowermost busbar and connected to the first end of the first-phase armature winding, the at least one first connection terminal extending in the axial direction;
    at least one second connection terminal mounted to an inner peripheral surface or an outer peripheral surface of at least the first end of the intermediate busbar and connected to the first end of the second-phase armature winding, the at least one second connection terminal extending in the axial direction; and
    at least one third connection terminal mounted to an inner peripheral surface or an outer peripheral surface of the first end of the uppermost busbar and connected to the first end of the third-phase armature winding, the at least one third connection terminal extending in the axial direction; and
  each of the lowermost, intermediate, and uppermost busbars includes a recess formed inwardly in a portion thereof,
    the portion with the recess of each of the lowermost, intermediate, and uppermost busbars being located to radially face one of the first, second, and third connection terminals of another of the lowermost, intermediate, and uppermost busbars, and
    the recess of each of the lowermost, intermediate, and uppermost busbars being configured to enable the one of the first, second, and third connection terminals of the other of the lowermost, intermediate, and uppermost busbars to bypass the corresponding one of the lowermost, intermediate, and uppermost busbars.

6. A method of manufacturing a rotary electric machine that comprises:
  an armature that comprises an armature core and first-, second-, and third-phase armature windings wound at least around the armature core;
  a magnetic field generator that generates a magnetic field;
  a busbar unit that comprises:
    at least first-, second-, and third-phase busbars electrically connected to the respective first-, second-, and third-phase armature windings,
      the first-phase busbar serving as a lowermost busbar located to face the armature core in an axial direction,
      the second-phase busbar serving as an intermediate busbar stacked over the lowermost busbar in the axial direction, and
      the third-phase busbar serving as an uppermost busbar stacked over the intermediate busbar in the axial direction so that the lowermost busbar, the intermediate busbar, and the uppermost busbar are stacked in the axial direction; and
    a resin member that covers the lowermost busbar, the intermediate busbar, and the uppermost busbar stacked in the axial direction so that the lowermost busbar, the intermediate busbar, and the uppermost busbar are integrated to constitute a busbar stack; and a protrusion member mounted to the intermediate busbar and protruding radially outward from the intermediate busbar, at least part of the protrusion member being located so as to be nonoverlapped with the uppermost busbar and the lowermost busbar in the axial direction, the method comprising:
- covering the intermediate busbar with first resin while a part of the protrusion portion is supported, resulting in the supported part of the protrusion member being an exposed part that is non-covered with the first resin;
- locating, below the intermediate busbar, the first-phase busbar to serve as the lowermost busbar;
- stacking, over the intermediate busbar, the third-phase busbar to serve as the uppermost busbar so that the busbar stack comprised of the lowermost busbar, the intermediate busbar, and the uppermost busbar is constructed; and
- covering the busbar stack with second resin to accordingly enclose the busbar stack, including the exposed part, with the second resin, thus integrally packaging the busbar stack with the second resin, wherein the exposed part of the protrusion member is radially offset with respect to the uppermost busbar and the lowermost busbar.

7. An armature comprising:

an armature core;

first-, second-, and third-phase armature windings wound at least around the armature core;

a busbar unit that comprises:
- at least first-, second-, and third-phase busbars electrically connected to the respective first-, second-, and third-phase armature windings,
  - the first-phase busbar serving as a lowermost busbar located to face the armature core in an axial direction,
  - the second-phase busbar serving as an intermediate busbar stacked over the lowermost busbar in the axial direction, and
  - the third-phase busbar serving as an uppermost busbar stacked over the intermediate busbar in the axial direction so that the lowermost busbar, the intermediate busbar, and the uppermost busbar are stacked in the axial direction; and
- a resin member that covers the lowermost busbar, the intermediate busbar, and the uppermost busbar stacked in the axial direction so that the lowermost busbar, the intermediate busbar, and the uppermost busbar are integrated to constitute a busbar stack; and a protrusion member mounted to the intermediate busbar and protruding radially outward from the intermediate busbar, at least part of the protrusion member being located so as to be nonoverlapped with the uppermost busbar and the lowermost busbar in the axial direction, wherein:

the intermediate busbar is covered with first resin;

at least part of the protrusion member is an exposed part that is non-covered with the first resin;

the exposed part of the protrusion member is radially offset with respect to the uppermost busbar and the lowermost busbar; and the resin member is a second resin that covers the uppermost busbar, the resin-covered intermediate busbar and the exposed part, and the lowermost busbar.

* * * * *